United States Patent [19]

Reytblatt

[11] 3,994,598

[45] Nov. 30, 1976

[54] PHOTOELASTIC STRAIN GAUGE COATING

[76] Inventor: Zinovy V. Reytblatt, 530 W. Aldine, Chicago, Ill. 60657

[22] Filed: Sept. 15, 1975

[21] Appl. No.: 613,319

[52] U.S. Cl. .................................. 356/34; 73/88 A; 356/35
[51] Int. Cl.² .......................................... G01B 11/18
[58] Field of Search .............................. 356/32–35; 350/149; 73/88 A, 89; 324/134 ST; 33/DIG. 3, DIG. 13; 338/2–6

[56] References Cited

UNITED STATES PATENTS

| | | | |
|---|---|---|---|
| 2,014,688 | 9/1935 | Mabboux | 356/34 |
| 3,130,383 | 4/1964 | Hottinger | 338/5 |
| 3,196,676 | 7/1965 | Pien | 338/4 |
| 3,313,204 | 4/1967 | Oppel | 356/34 |
| 3,559,467 | 2/1971 | Gurol et al. | 338/2 |

OTHER PUBLICATIONS

Van Leeuwen et al. "Resistance Wire Strain Gage Applications & Circuits" Product Engineering, July 1945, pp. 443–448.

Budd, Advertisement from The Budd Co., P.O. Box 245, Phoenixville, Pa.-Strain Gage Readings, vol. 6, No. 3, Aug.-Sept. 1963, p. 79.

Primary Examiner—Edward S. Bauer
Assistant Examiner—Wm. H. Punter
Attorney, Agent, or Firm—Prangley, Dithmar, Vogel, Sandler and Stotland

[57] ABSTRACT

The coating comprises a sheet of photoelastic material having a multiplicity of regions, in each of which is a plurality of measuring elements at predetermined angles. Each of the measuring elements has an abutment and a finger in operating contact with each other. There will appear in each finger patterns representative of the strain in the associated portion of the workpiece. These patterns are "read" and the values plugged into formulas to determine the magnitude of the strain in each of the two principal directions, and the angle of the principal directions.

14 Claims, 6 Drawing Figures

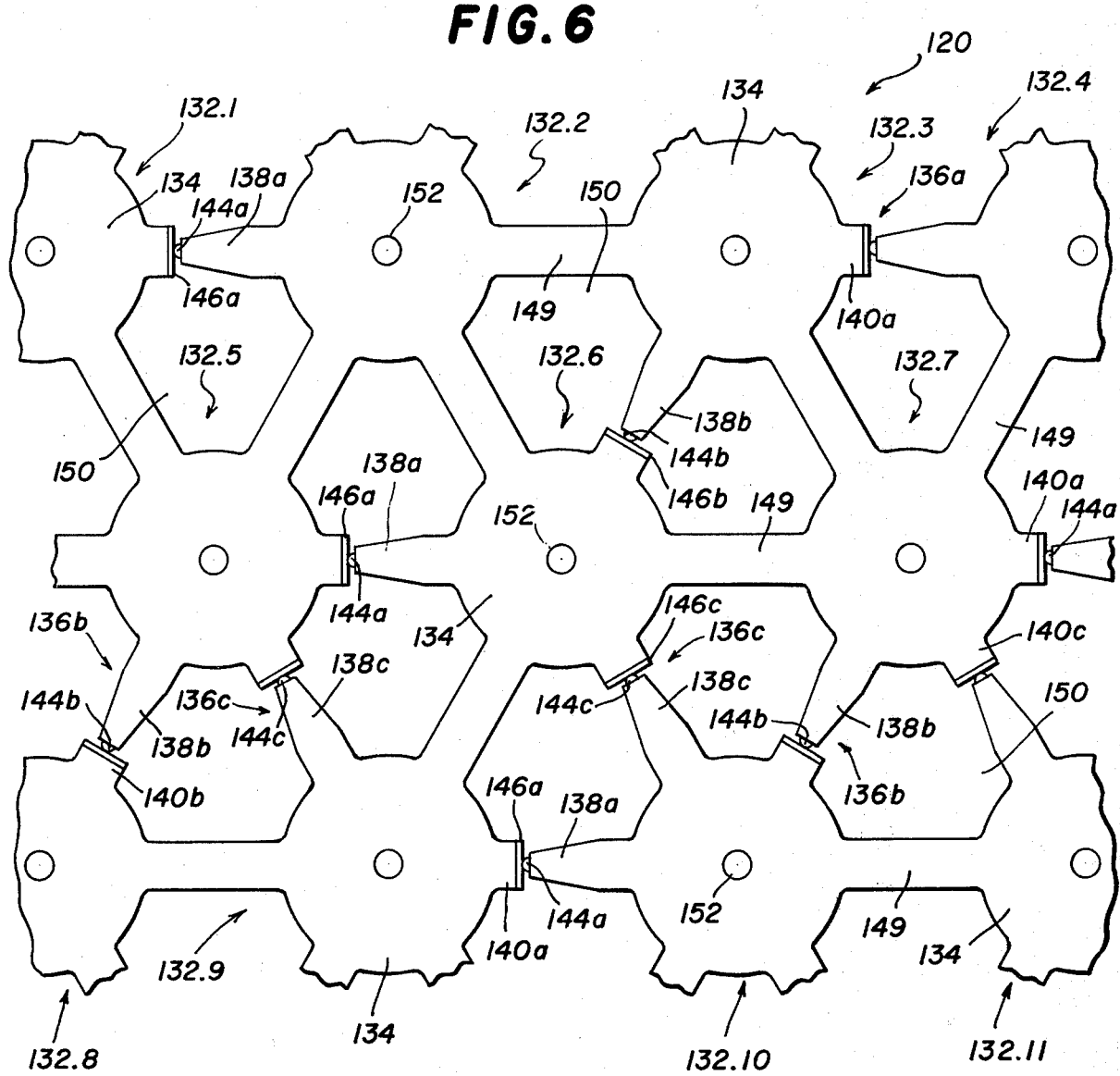

PHOTOELASTIC STRAIN GAUGE COATING

BACKGROUND OF THE INVENTION

Photoelastic material has the optical properties of polarizing light when under stress and transmitting such light on the principal stress planes. The velocities of the light depend on the strain in the workpiece, which phenomenon is known as "birefringence." The photoelastic material is clear, elastic and should be homogeneous, optically isotropic when under no stress or strain, and reasonably free from creep, aging, and edge disturbance. Examples of photoelastic material are Bakelite, celluloid, gelatin, synthetic resins, glass and other such commercial products that are optically sensitive to stress and strain.

When the photoelastic material is subject to monochromatic polarized light, the birefringence of the photoelastic material causes the light to emerge refracted in two orthogonal planes. Because the velocities of light propagation are different in each direction, there occurs a phase shifting of the light waves. When the waves are recombined with polarizing film, regions of stress where the wave phase is canceled appear black, and regions of stress where the wave phase is combined appear light. When white light is used in place of monochromatic light, the relative retardation of the photoelastic material causes the fringes to appear in colors of the spectrum.

In using a photoelastic strain gauge to measure strain in the workpiece, the gauge is bonded to the workpiece surface and illuminated by polarized light. A photograph is taken of the gauge which depicts patterns that an experienced technician can "read," to determine the difference of the strain in the workpiece along the two principal directions. The principal directions of the strain have, in the past, been determined by noting the orientation of the polarizing device. Additional photographs are taken for additional orientations of the polarizing device, thereby to obtain the principal directions of strain throughout the area of the workpiece covered by the gauge. This procedure is too timeconsuming and expensive because of the need to change the orientations of the polarizing device and to take multiple photographs.

Also, in the past, a gauge was specially constructed to conform to the shape of the workpiece.

SUMMARY OF THE INVENTION

It is therefore an important object of the present invention to enable determination of the magnitude and direction of strain in a workpiece with only two photographs.

Another object is to provide a photoelastic strain gauge coating which does not have to be specially constructed to conform to the workpiece.

In summary there is provided a photoelastic strain gauge coating adapted to be bonded to a surface of a workpiece, comprising a sheet of photoelastic material including a multiplicity of regions, each of the regions having a plurality of measuring elements respectively at predetermined angles to each other, each of the measuring elements having an abutment and a finger in operating contact therewith, whereby there will appear in each of the fingers patterns representative of the strain in the region of the workpiece associated with such finger.

The sheet of photoelastic material may be cut to any desired shape and then bonded to the surface of a workpiece. Readings based on the patterns appearing in each of the fingers may be inserted into suitable formulas to obtain the magnitude of the strain in each of the two principal directions and the angle of such principle directions in the vicinity of the node.

BRIEF DESCRIPTION OF THE DRAWINGS

FIG. 6 is a plan view of a fragmentary portion of a photoelastic strain gauge coating which incorporates features of another embodiment of the present invention.

DESCRIPTION OF THE PREFERRED EMBODIMENT

Figure 1:
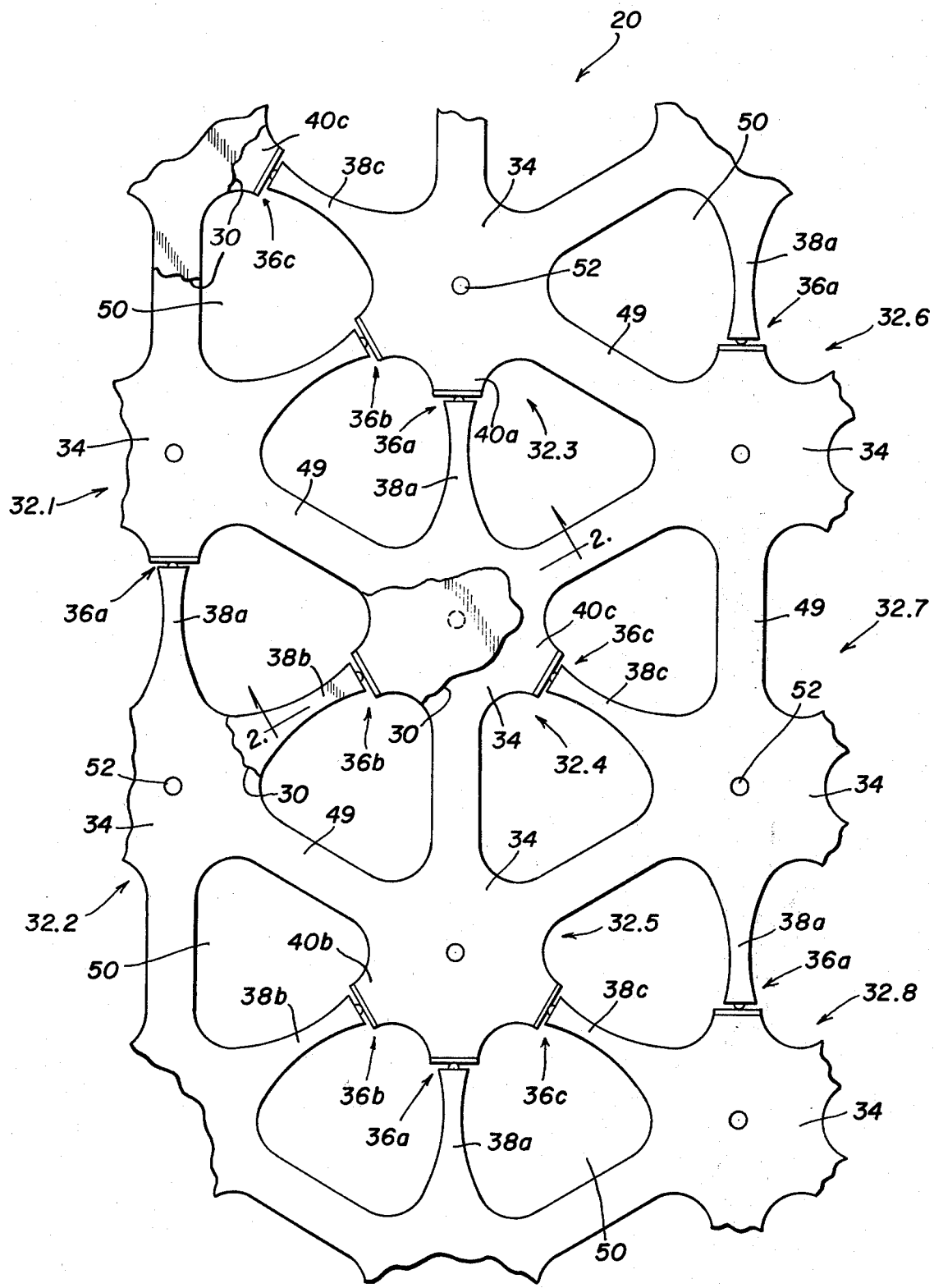
FIG. 1 is a plan view of a fragmentary portion of a photoelastic strain gauge coating which incorporates the features of the present invention.
Figure 2:
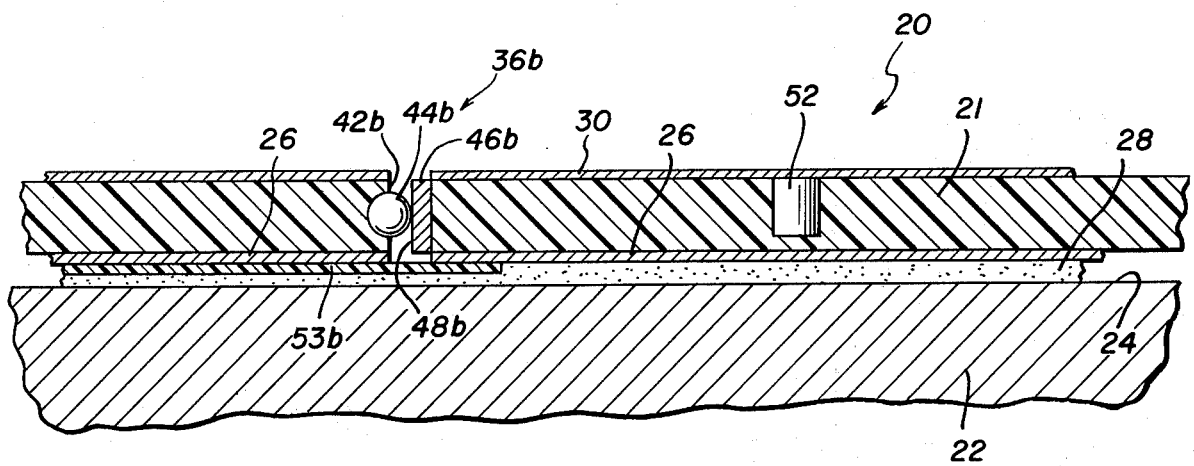
FIG. 2 is a sectional view on an enlarged scale taken along the line 2—2 of FIG. 1 and also illustrating a fragmentary portion of a workpiece to which the coating is bonded.

Turning now to FIGS. 1 and 2, a coating 20 is bonded to a workpiece 22 to obtain information on the strain therein. "Stress" and "strain" are sometimes used interchangeably in this application since one can be determined if the other is known and a stress-strain diagram is available. The coating 20 includes a sheet of photoelastic material 21. A sheet of reflective material 26 is bonded to the underside of the sheet 21, or, instead reflective plating may be deposited thereon. A polarizing film 30 is bonded to the top side of the sheet 21, which film polarizes light passing through it. Alternatively, a polarizing light source may be provided in which case the film 30 becomes unnecessary. The coating 20 is bonded to the surface 24 by cement 28 or other suitable means.

When the coating 20 is illuminated by polarized light, the birefringent characteristics of the sheet of photoelastic material 21, causes the velocity of light rays passing through it to be dependent upon the stresses in the workpiece 22. Thus, the light reflected from the sheet 26 produces visual patterns in the coating 20.

Figure 3:
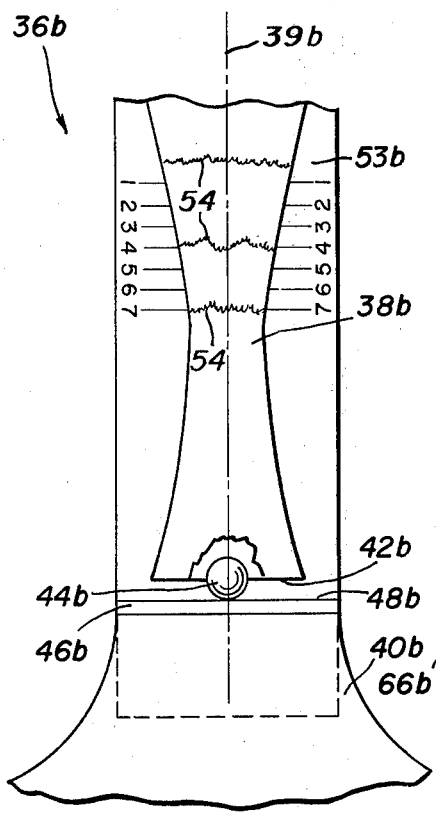
FIG. 3 is an enlarged view of one of the measuring elements of FIG. 1, but on an enlarged scale.

The coating 20 includes a multiplicity of regions, eight of which are shown in whole or in substantial part in FIG. 1, and are labeled 32.1 to 32.8 respectively, each of which regions includes a center portion 34 and a set of three measuring elements 36a, 36b and 36c. Each measuring element 36b, illustrated in enlarged scale in FIG. 3, includes a finger 38b (defined by a longitudinal axis 39b) and an abutment 40b. The finger 38b has a free end 42b that has a semispherical depression therein that receives a ball bearing 44b. In the form of FIG. 3, each side of the finger 38b has two hyperbolically shaped portions with asymptotes parallel to the axis 39b. In the region of the end 42b the sides of the finger 38b are therefore, flared. Affixed to the abutment 40b is a plate 46b having an abutment surface 48b that is in contact with the ball bearing 44b. Thus, the finger 38b is in operative contact with the abutment 40b. The finger 38b is arranged so that its axis 39b is substantially perpendicular to the plate 46b.

Each of the measuring elements 36b throughout the coating 20 has the construction shown in FIG. 3. Each of the measuring elements 36a and 36c has the same construction and to the extent shown in FIG. 1 carries the same reference numeral, but with an appropriate letter suffix.

All of the measuring elements 36b are oriented at 30°, that is to say, the longitudinal axis of each of the fingers 38b is directed along a line at +30° and +210°. For the sake of simplicity, only the former angle will be designated. Each of the measuring elements 36a is located at +90°, that is to say, each of the fingers 38a is directed along the line at +90° and +270°. Each of the measuring elements 36c is at an angle of +150°, that is, it is directed along the line at +150° and +330°. Thus, the angles of the elements 36c and 36b are ±60° respectively with respect to the elements 36a. The significance of the angles of the measuring elements 36a to 36c will be described hereinafter.

Each of the measuring elements 36a to 36c is part of two different regions 32.1 to 32.8. For example, the measuring element 36a for the region 32.3 is also the measuring element for the region 32.4. Similarly, the measuring element 36c is in the region 32.5 and also part of the region 32.8. It will also be noted that the orientation of each of the measuring elements 36a to 36c is not the same throughout the coating 20. For example, the element 36a associated with the regions 32.3 and 32.4 has its finger or ball bearing directed upwardly, whereas the finger or the ball bearing of the element 36a associated with the regions 32.7 and 32.8 is directed downwardly. They both function in the same manner and produce corresponding patterns. The same effect would be achieved if either of the measuring elements was reversed in orientation.

The coating 20 also includes a multiplicity of links 49 which interconnect the center portions 34. It will be noted that the measuring elements 36a to 36c and the links 49 define irregularly shaped openings 50 which are present throughout the coating 20. It is to be noted that the links 49 enable the coating 20 to be integral, that is, one can trace a continuous path through the links 49 throughout the coating 20. In the center of each portion 34 is a hole 52 about which are generated patterns yielding additional strain information.

Although not shown in FIG. 1 for the sake of simplicity, it is desirable that each of the measuring elements 36b have a strip of material 53b (FIG. 3) such as polyethylene, loosely bonded to the finger 38b and the abutment 40b. A suitable legend may be provided on the strip 53b to facilitate reading of the strain magnitude, as will be described. The strip 53b serves the further purpose of excluding the cement 28 from the juncture of the finger 38b and the abutment 40b. It is important that the finger 38b be free to "move" relative to the abutment 40b. Similar strips would preferably be loosely bonded to all of the measuring elements 36a to 36c.

Preferably the coating 20 is manufactured in bulk and may be stored, for example, in roll form. In use, a piece is cut out to provide a coating 20. Cement 28 is applied to the workpiece surface 24 on which is placed the coating 20. The coating is then illuminated by polarized light, or nonpolarized light if the polarizing film 30 is used. The strain in the workpiece 22 is translated to the coating 20, which, because of the properties of photoelastic material discussed previously herein, causes patterns 54 to appear. A photograph is usually taken so that the patterns can be examined and analyzed at a later time.

Because the finger 38b is narrower than the abutment 40b, practically all of the patterns are focused in the finger 38b. Shear in the workpiece 22 that is perpendicular to the axis 39b does not affect the patterns in the finger 38b by virtue of the ball bearing 44b bearing against the adjacent plate 46b. The photoelastic material is relatively soft and may be deformed by the ball bearing 44b pressing thereagainst, and thereby transfer shear to the finger 38b. The plate 46b distributes the force and thereby prevents deformation. Thus, only strain which is the result of compressive and tensile forces in the workpiece 22 acting along the finger axis 39b affects the patterns 54.

A technician skilled in the art of "reading" patterns on photoelastic devices will be able to determine the magnitude of the strain in the associated portion of the workpiece. The hyperbolic shape of the sides of the finger 38b enables the lines defining the pattern 54 to be evenly spaced so as to facilitate reading of them. During manufacture, the coating 20 is prestressed in the sense that each of the fingers 38a to 38c is exerting a force against the corresponding abutments 40a to 40c.

The technician reads and notes the magnitude of strain in the measuring elements 36a to 36c of one region, say the region of 32.3. He then can calculate the magnitude of the strain $E_1$ in one principal direction, the strain $E_2$ in the second principal direction, and the angle A between the abcissa and the first direction of strain in accordance with the following formulas where $X_1$ represents the reading on the finger 38a, $X_2$ represents the reading on the finger 38b, $X_3$ represents the reading on the finger 38c in the region 32.3 (the angle of the other principal strain direction is obtained by adding 90° to A); and K is a constant determined by initial calibration of the coating 20:

$$E_1 = K[\tfrac{1}{3}(X_1 + X_2 + X_3) + \tfrac{2}{3}\sqrt{X_1^2 + X_2^2 + X_3^2 - X_1X_2 - X_1X_3 - X_2X_3}]$$
$$E_2 = K[\tfrac{1}{3}(X_1 + X_2 + X_3) - \tfrac{2}{3}\sqrt{X_1^2 + X_2^2 + X_3^2 - X_1X_2 - X_1X_3 - X_2X_3}]$$
$$A = \tfrac{1}{2}\text{Arctan}\ \frac{\sqrt{3}\,(X_2 - X_3)}{2X_1 - X_2 - X_3}$$

Strain in the rest of the regions 32.1, 32.2 etc., are similarly measured and calculated to obtain a strain field.

Patterns will also appear in or about each of the holes 52. These patterns may be used as a check against the results achieved by the foregoing formulas. Such information can also be used in what is known as a least square approximation, to reduce any possible errors.

Figure 4:
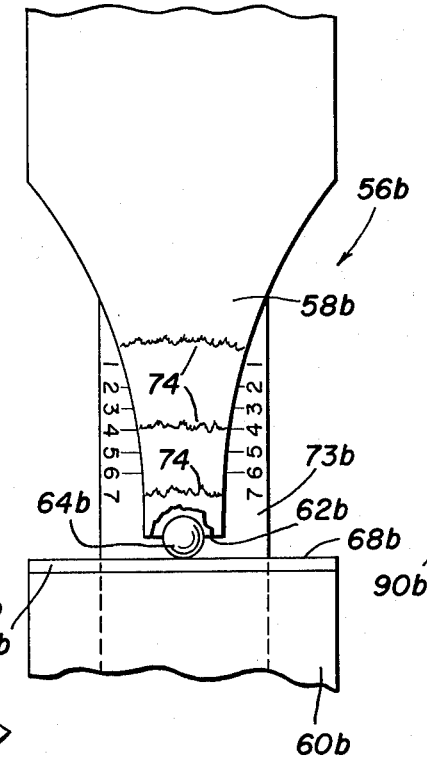
FIG. 4 is a view like FIG. 3, but illustrating a second embodiment of a measuring element.
Figure 5:
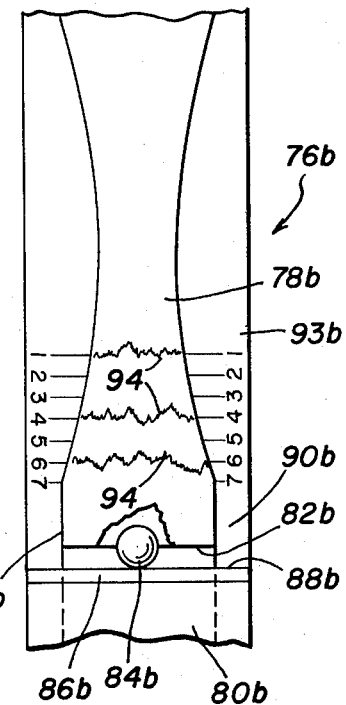
FIG. 5 is a view like FIG. 3, but illustrating a third embodiment of a measuring element.

A second embodiment of a measuring element is depicted in FIG. 4, and bears the reference numeral 56b. Parts of the measuring element 56b corresponding to the measuring element 36b are labeled with corresponding reference numerals with 20 added thereto. The measuring element 56b includes a finger 58b and an abutment 60b. The finger 58b has a free end 62b with a semicircular depression therein for a ball bearing 64b. Affixed to the abutment 60b is a plate 66b having an abutment surface 68b which is in contact with the ball bearing 64b. The sides of the finger 58b are also hyperbolically shaped in this form, but the end 62b is at a point where the width of the finger 58b is narrowest. A third form of the measuring element is depicted in FIG. 5 and bears the reference numeral 76b. Parts corresponding to those in the element 36b bear corresponding reference numerals with 40 added thereto. In this form the sides of the finger 78b are again hyperbolic, but the end 82b has sides 90b that are substantially parallel.

FIG. 6 illustrates a different format. The coating in this form bears the reference numeral 120, and the parts corresponding to the parts of FIG. 1 bear corresponding reference numerals with 100 added thereto. The coating 120 includes a multiplicity of regions, of which eleven are shown and are identified wth the reference numerals 132.1 to 132.11, respectively, each of which regions includes a center portion 134 and a set of three measuring elements 136a, 136b and 136c. Each of these measuring elements has basically the same construction as the measuring element 36b illustrated in FIG. 3. Specifically, each element 136a includes a finger 138a, an abutment 140a, a ball bearing 144a and a plate 146a, whereby the finger 138a is in operative contact with the associated abutment 140a. Similarly, the measuring elements 136b and 136c have corresponding parts, but followed by the suffixes b and c respectively.

All of the measuring elements 136a are oriented at 0°, that is to say, the longitudinal axis of each of the fingers 138a is directed along a line at 0° and 180°. Each of the measuring elements 136b is located at −60°, that is, each of the fingers 138b is located along the line −60°, and +120°. Each of the measuring elements 136c is at an angle +60°, that is, it is directed along a line at +60° and +240°. Thus, in this form, too, the measuring elements 136a, 136b and 136c are respectively located at 0° and ±60°. In the same way that each of the measuring elements 38a to 38c in the form of FIG. 1 was part of two different regions, so, too, each of the measuring elements 136a to 136c is part of two different regions 132.1 to 132.11.

In this form, each of the fingers 138a to 138c is generally wedge-shaped as opposed to the hyperbolic construction in FIGS. 1 to 5. The patterns which will appear on the fingers are "read" by a technician and the strains $E_1$ and $E_2$ and the angle A are calculated, using the foregoing formulas. The lines corresponding to these patterns will be closer together in the region of the tip of the fingers, as opposed to the even spacing of the lines with the embodiments of FIGS. 1 to 5.

The coating 120 also includes a multiplicity of links 149 which interconnect the center portions 34. In the center of each portion 134 is a hole 152 which serves the same purpose as the holes 152 in the first form. Although not clear from FIG. 6, it is to be understood that the coating 120 includes a reflective sheet or plating like the reflective sheet 26, and preferably includes a strip like the strip of 53b depicted in FIG. 2.

What has been described, therefore, is an improved photoelastic strain gauge coating which can be cut to any desired size and shape and yield fairly accurate determinations of the magnitude of strain in the two principal directions and the determination of the angles of such directions.

What is claimed is:

1. A photoelastic strain gauge coating adapted to be bonded to a surface of a workpiece, comprising an integral sheet of photoelastic material including a multiplicity of regions, each of said regions having a plurality of measuring elements respectively at predetermined angles to each other, each of said measuring elements having an abutment and a finger in operating contact therewith, whereby there will appear in each of said fingers patterns representative of the strain in the region of the workpiece associated with such finger.

2. The photoelastic strain gauge coating of claim 1, wherein each of said measuring elements further has means between said finger and said abutment to reduce the effect on the patterns of strains in the workpiece other than compressive and tensile in the direction of elongation of said finger.

3. The photoelastic strain gauge coating of claim 2, wherein said means is a ball bearing.

4. The photoelastic strain gauge coating of claim 2, wherein said means includes a plate on said abutment and a ball bearing on the adjacent end of said finger.

5. The photoelastic strain gauge coating of claim 1, wherein said finger is substantially wedge-shaped.

6. The photoelastic strain gauge coating of claim 1, wherein the sides of each of said fingers are substantially hyperbolic.

7. The photoelastic strain gauge coating of claim 6, wherein the end of each of said fingers in operative contact with the associated abutment is narrower than the rest of said finger.

8. The photoelastic strain gauge coating of claim 6, wherein the end of each of said fingers in operative contact with the associated abutment is flared.

9. The photoelastic strain gauge coating of claim 6, wherein the end of each of said fingers in operative contact with the associated abutment has substantially parallel sides.

10. The photoelastic strain gauge coating of claim 1, wherein each of said regions has three of said measuring elements.

11. The photoelastic strain gauge coating of claim 10, wherein the angle between two of said fingers in each of said measuring elements is about 120°, and the third finger is located substantially midway between said two fingers.

12. The photoelastic strain gauge coating of claim 1, wherein each of said regions has a node for focusing patterns representative of the strain.

13. The photoelastic strain gauge coating of claim 12, wherein each of said regions further has a strip of material loosely attached to the undersides of the associated finger and abutment.

14. The photoelastic strain gauge coating of claim 12, and wherein each of said furthering elements has a polarizing film on the associated fingers.

* * * * *